US006812918B2

(12) United States Patent  (10) Patent No.: US 6,812,918 B2
Yang  (45) Date of Patent: Nov. 2, 2004

(54) FOOT CONTROLLED ROLLING BALL SIGNAL GENERATOR

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 266 days.

(21) Appl. No.: 10/212,724

(22) Filed: Aug. 7, 2002

(65) Prior Publication Data

US 2003/0117373 A1 Jun. 26, 2003

Related U.S. Application Data

(63) Continuation-in-part of application No. 10/022,204, filed on Dec. 20, 2001, now abandoned.

(51) Int. Cl.[7] ................................................ G09G 5/08
(52) U.S. Cl. ...................................... 345/167; 385/156
(58) Field of Search ........................... 73/146; 200/86.5, 200/61.89; 307/112, 115, 116, 119; 338/108; 340/665, 666; 341/20, 21; 345/155–174; 433/101; 482/901; 463/6, 36, 38

(56) References Cited

U.S. PATENT DOCUMENTS

| | | | | | |
|---|---|---|---|---|---|
| 5,334,997 | A | * | 8/1994 | Scallon ........................ | 345/167 |
| 5,635,777 | A | * | 6/1997 | Telymonde et al. ......... | 307/119 |
| 5,635,957 | A | * | 6/1997 | Feierbach et al. .......... | 345/163 |
| 5,745,055 | A | * | 4/1998 | Redlich et al. ............... | 341/20 |
| 5,838,305 | A | * | 11/1998 | Bookstein .................... | 345/163 |
| 5,883,615 | A | * | 3/1999 | Fago et al. .................. | 345/156 |
| 5,907,318 | A | * | 5/1999 | Medina ....................... | 345/163 |
| 6,091,402 | A | * | 7/2000 | Howell ........................ | 345/157 |
| 6,422,942 | B1 | * | 7/2002 | Jeffway et al. ............... | 463/31 |
| 6,611,250 | B1 | * | 8/2003 | Prince et al. ................ | 345/163 |

* cited by examiner

Primary Examiner—Vijay Shankar
Assistant Examiner—Nitin Patel
(74) Attorney, Agent, or Firm—Bacon & Thomas, PLLC (57) ABSTRACT

The present invention is to provide a foot controlled rolling ball to generate signals for a main unit operation or for display, or for exercise, entertaining or interacting purpose.

8 Claims, 9 Drawing Sheets

FOOT CONTROLLED ROLLING BALL SIGNAL GENERATOR

This application is a Continuation-in-part of nonprovisional application No. 10/022,204 filed Dec. 20, 2001 now abandoned.

BACKGROUND OF THE INVENTION (a) Field of the Invention

The present invention relates to a signal generator, and more particularly, to a foot controlled rolling ball for main unit operation or display or for exercise, or entertaining or interacting purpose.

(b) Description of the Prior Art

Foot controlled signal generators of the prior art operate by pedal control, e.g. stepping on a brake or throttle in control of an automobile.

SUMMARY OF THE INVENTION

The primary purpose of the present invention is to provide a foot controlled rolling ball to generate signals for a main unit operation or for display, or for exercise, entertaining or interacting purpose.

DETAILED DESCRIPTION OF THE PREFERRED EMBODIMENTS

Conventional foot controlled signal generator is executed by pedal control, such as stepping on a brake or a throttle in an automobile. The present invention relates to a structure and its applications of a foot controlled rolling ball signal generator for main unit operation or display, or interacting or as a foot exerciser.

Figure 1:
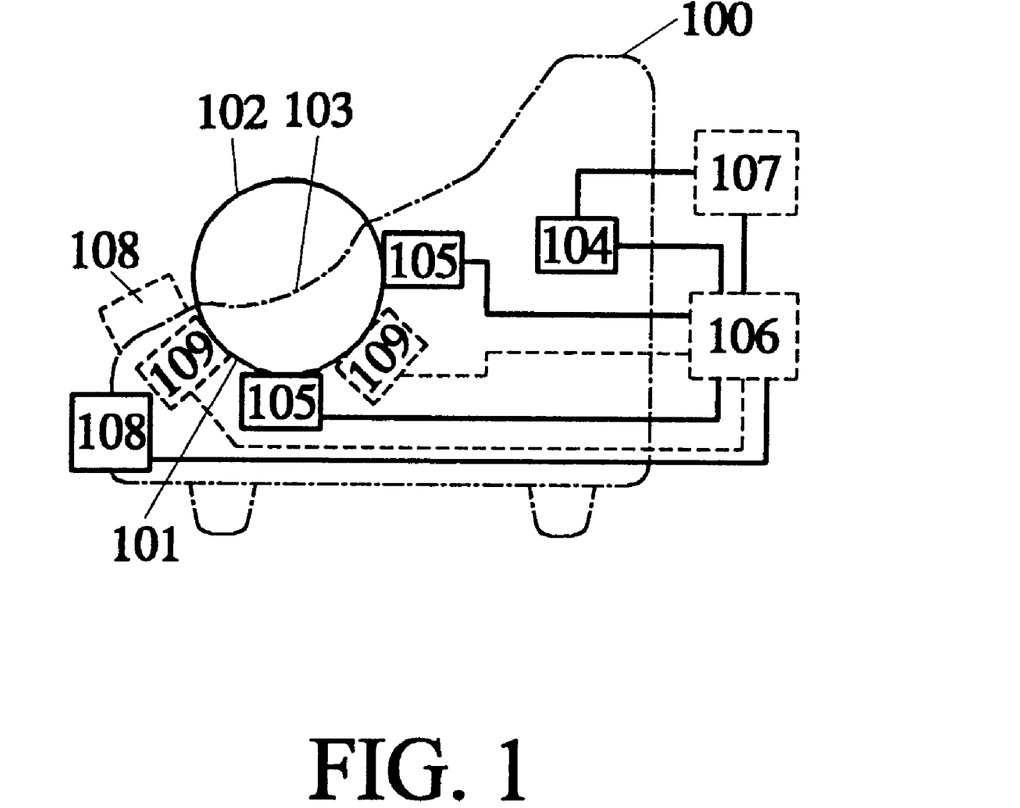
FIG. 1 is a circuit block chart of a preferred embodiment of the present invention.
Figure 2:
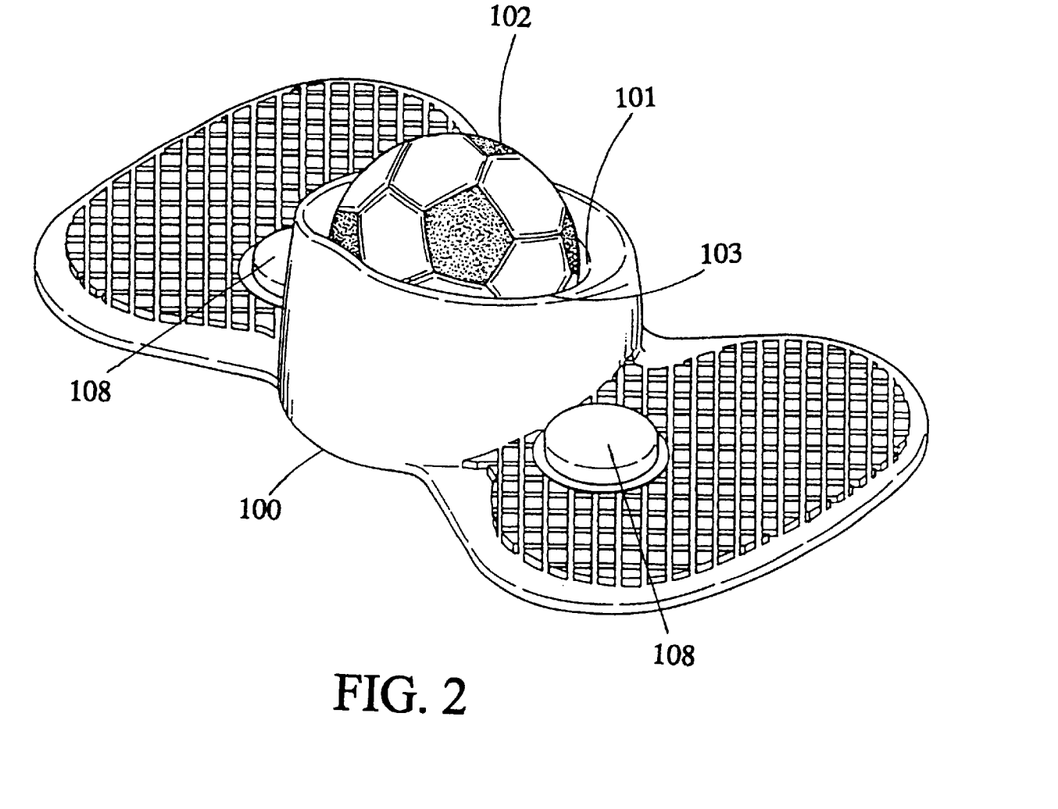
FIG. 2 is a perspective view of the preferred embodiment of the present invention.

Referring to FIGS. 1 and 2 respectively for a circuit block chart and a perspective view of a preferred embodiment of the present invention, wherein, a foot controlled signal generator is essentially comprised of:

a housing 100: made of plastic, metal or wood or other selected material and a selected geometric form, including a ball holder 101 to couple a rolling ball 102; one or more than one segmental structure on the edge of the ball holder 101 to secure and restrict the segmental structure 103; and a selected number of low friction bearing, roller or needle structure at selected locations on the ball holder 101 to support the rolling ball 102 with low friction; the housing 100 being supported by multiples of foot in stationary model or each of those feet being provided with a roller and a braking device for mobile model; the housing 100 may be in a structure extending sideways to improve stability, furthermore, an operation switch may be added as required;

a power supply 104: comprised of a DC source converted from city power, a rechargeable battery, a super capacitor, or other storage device to supply power;

a rolling ball 102: made of selected material in a full or approximately spherical shape to be coupled to a spherical ball holder 101 of the housing 100 subject to operation by foot; a coupling mechanism for the roller ball 102 and the ball holder 101 of the housing 100 allowing to be removed or installed as desire, or being provided with an optional ring or a protruding bit to prevent falling of the rolling ball 102; the rolling ball 102 may be made in a specified structure to match the housing 100, and may be provided or omitted as required while its housing 100 is available to be adapted to any spherical object with given dimension and material;

a detection 105: operating by means of optical-electric or electromagnetic induction or static induction or conduction contact means to directly detect the motion status of the rolling ball 102; or being driven indirectly by the rolling ball 102 through a transmission system to detect direction and momentum of the rolling ball 102; or as required, the detection 105 being capable of indicating rolling speed to control a main unit 106 or a display 107;

an auxiliary pedal controller 108: comprised of a mechano-electronic or solid-state electronic switching device; one or more than one unit of the auxiliary pedal controller 108 being incorporated to the selected location for the housing 100 or independently provided for helping operation of kicking or stepping by the foot; further provided with a function of pressure detection to be adapted to the main unit 106 or the display 107 for relative control of the operation of the main unit 106 or the display 107;

a main unit 106: an optional unit, comprised of a mechano-electronic or a solid state electronic device, or a microprocessor and its peripheral circuits depending on the application; furthermore, a conductor, infrared, a RF electromagnetic wave, or ultrasonic equipment being provided to execute one-way or two-way wired or wireless transmission with the detection 105, the auxiliary pedal controller 108, and an active propelling device 109 for relative signal process based on operation signals from the rolling ball 102 and the auxiliary pedal controller 108, and for driving outputs to the display 107 or other devices; the main unit 106 may share the same structure with the housing 100 or can be an combined structure;

the display 107: also an optional device comprised of a mechano-electronic device, a solid-state electronic device, or a video CRT, multi-point LED, or OLED combination, PLED, PDP, LCD, TNLCD, PLED, bulb, or other device converting electric power into optical energy to display graphics, text, indication, and alarm; and to execute one-way or two-way wired transmission by means of conductor or wireless transmission by infrared or RF electromagnetic wave or ultrasonic device with the main unit 106; and the active propelling device 109: also an optional device, driven by electromagnetic effect, air pressure, oil hydraulic means, manual, or other sources to actively provide for the rolling ball 102 programmable, cyclic, irregular propelling or flapping in a same director or various directions at identical or various forces, or to drive the rolling ball 102 for displacement of other status to change the spacing between the rolling ball 102 and the ball holder 101 of the housing 100 and to transmit signals to the main unit 106 by means of a flat detection 110; the active propelling device 109 is an optional device.

The coupling plane between the rolling ball 102 and the ball holder 101 of the housing 100 is equivalent to, smaller than or slightly larger than a semi-sphere. Alternatively, between the rolling ball 102 and the ball holder 101 of the housing 100 a segmental structure 103 or a rolling bead is provided on the side closer to where operation takes place to facilitate manipulation of the rolling ball 102 by foot.

Furthermore, a floating structure by magnetism may be provided between the rolling ball 102 and the ball holder 101 of the housing 100 for indicating substantially absence of friction. Alternatively, a pressurized gas using an air pump provided between the rolling ball 102 and the ball holder 101 of the housing 100 is jetted from an outlet provided at a selected position on the ball holder 101 to float the rolling ball 102, thus to reduce the friction between the rolling ball 102 and the ball holder 101 of the housing 100.

Figure 3:
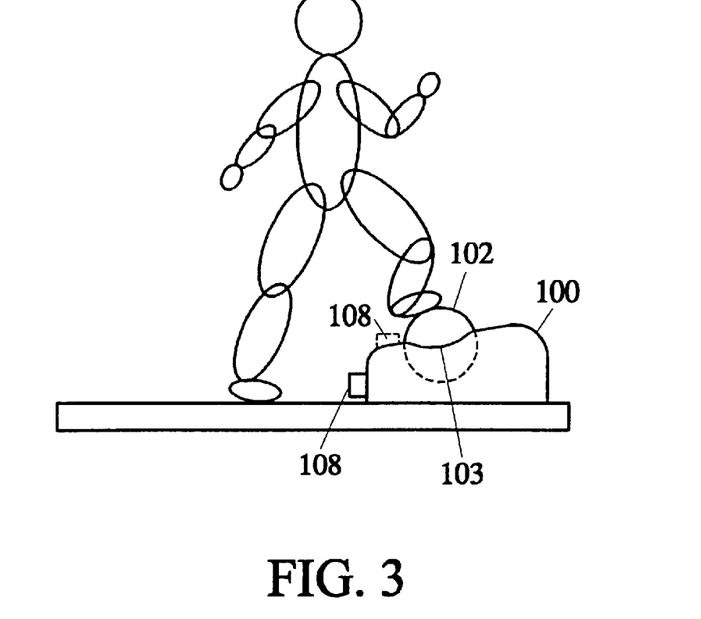
FIG. 3 is a schematic view showing that the preferred embodiment of the present invention is operated by a user in standing position.
Figure 4:
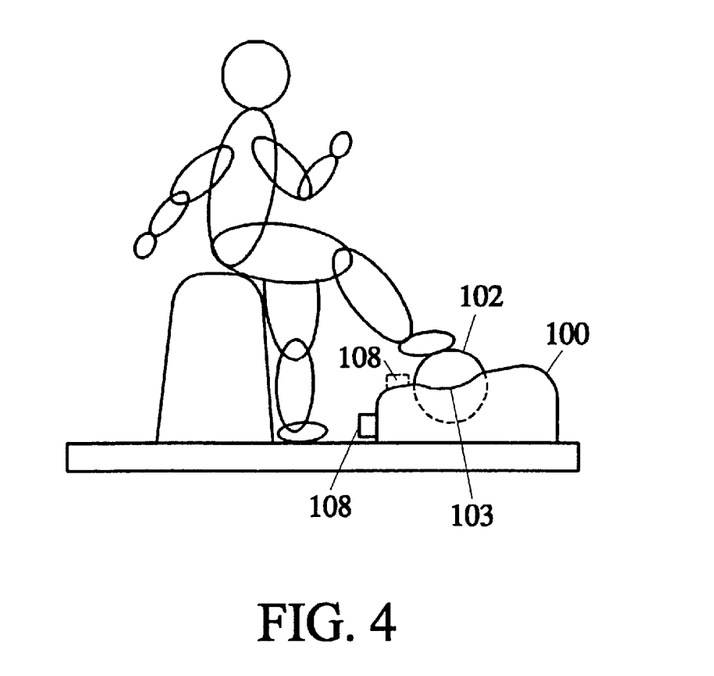
FIG. 4 is a schematic view showing that the preferred embodiment of the present invention is operated by a user in seated position.
Figure 5:
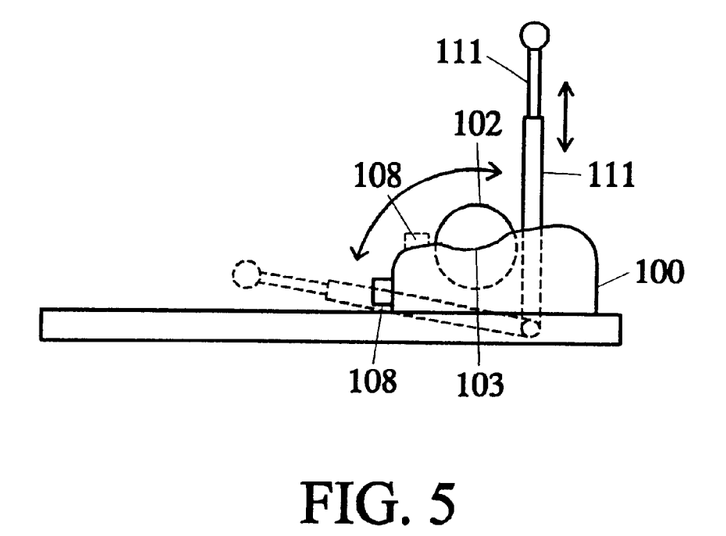
FIG. 5 is a view showing that a hand rest is added to the preferred embodiment of the present invention.
Figure 6:
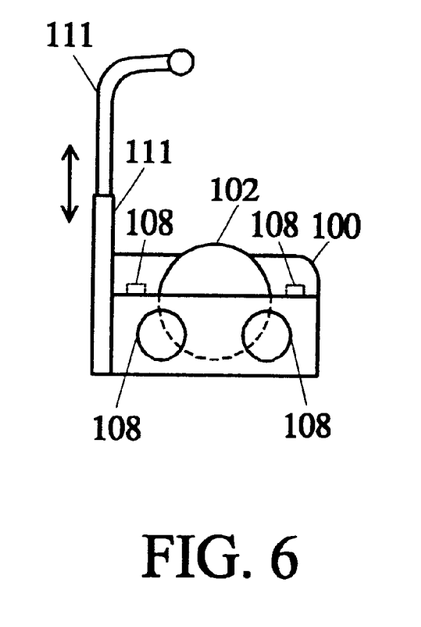
FIG. 6 is a front view of the preferred embodiment taken from FIG. 5.
Figure 7:
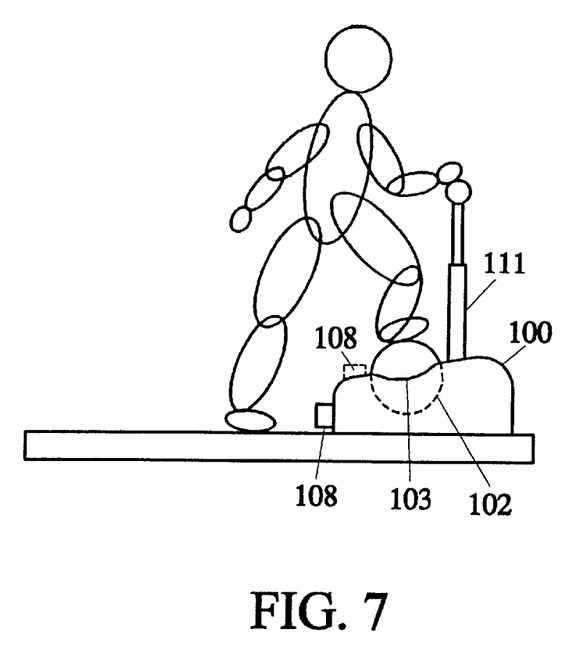
FIG. 7 is a schematic view showing that the preferred embodiment of the present invention taken from FIG. 5 is operated by a user in standing position.

The structure of the present invention to generate signals through control of a rolling ball by foot can be applied in various configurations. As illustrated in FIG. 1, it can be operated by the user in a standing or seated position. FIG. 3 illustrates that the preferred embodiment given in FIG. 1 is operated with the user in standing position and FIG. 4, seated position. A hand rest is added to help operation in standing position as illustrated in FIGS. 5 and 6. Referring to FIG. 7, which shows a schematic view of FIG. 5, wherein, a portion of the preferred embodiment of the present invention between the hand rest 111 and the housing 100 is made foldable, KD type, or integrated.

Figure 8:
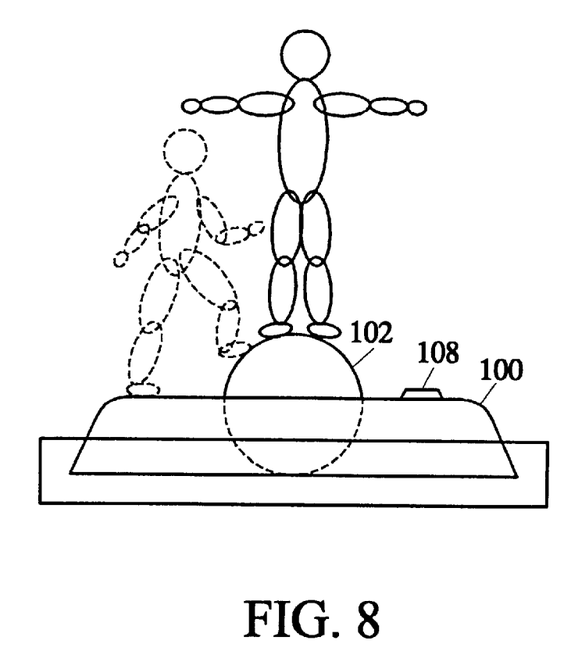
FIG. 8 is a schematic view showing that a user is standing on the preferred embodiment of the present invention.
Figure 9:
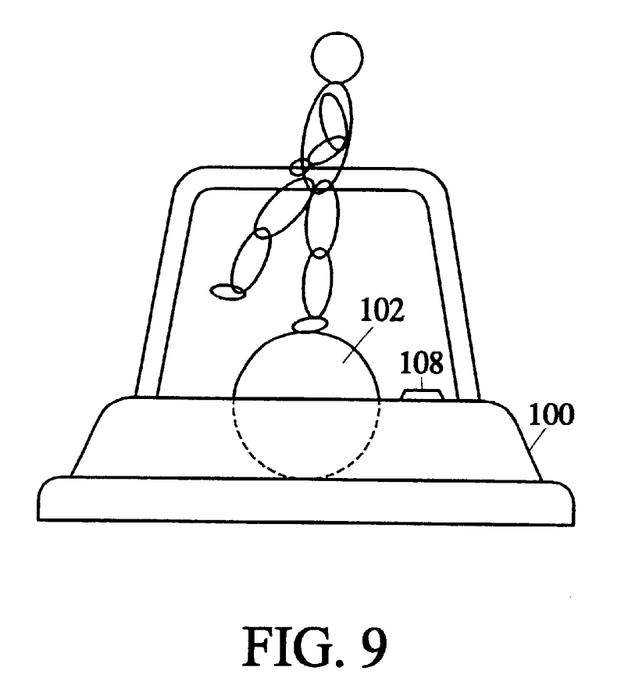
FIG. 9 is a schematic view showing that a user is standing on the preferred embodiment of the present invention with a hand rest.

The size of present invention can be made selectable as required. In another preferred embodiment as illustrated in FIG. 8, one or more than one unit of auxiliary pedal controller 108 is provided on a platform of the housing 100 so that the rolling ball is operated by one foot or by both feet of one or more than one users. For consistent operation and safety concerns, the hand rest 111 is provided on either side of on both sides of the housing as illustrated in FIG. 9.

Figure 10:
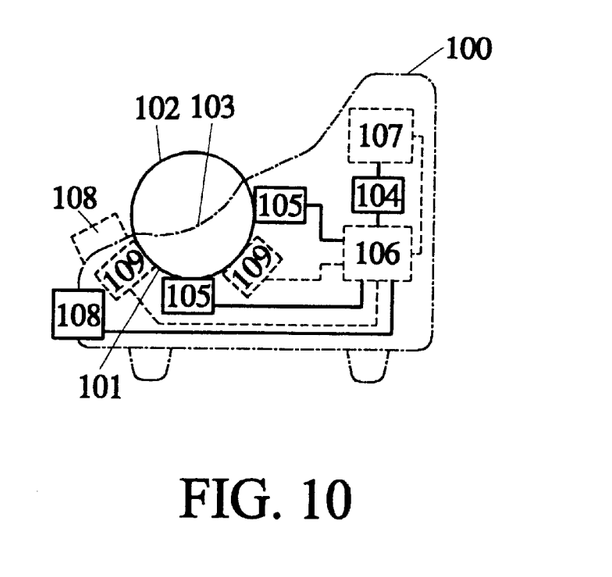
FIG. 10 is a schematic view showing an integrated structure of a main unit, a display and a housing in the preferred embodiment of the present invention.
Figure 11:
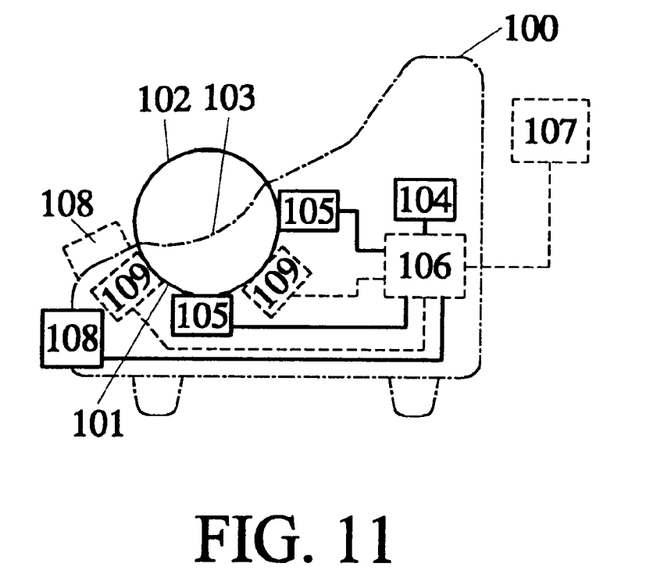
FIG. 11 is a schematic view showing an integrated structure of the main unit and the housing with the display independently provided in the preferred embodiment of the present invention.
Figure 12:
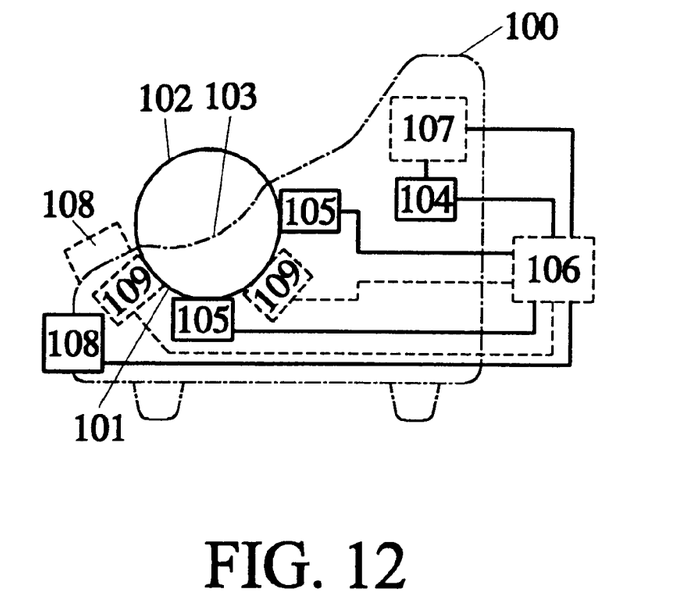
FIG. 12 is a schematic view showing an integrated structure of the display and the housing with the main unit independently provided in the preferred embodiment of the present invention.
Figure 13:
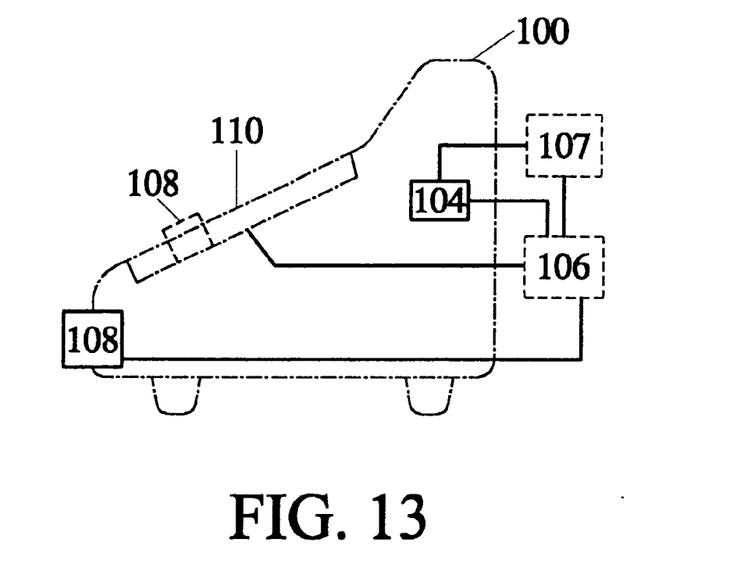
FIG. 13 is a schematic view showing that the rolling ball detection is replaced by a flat detection in another preferred embodiment of the present invention.
Figure 14:
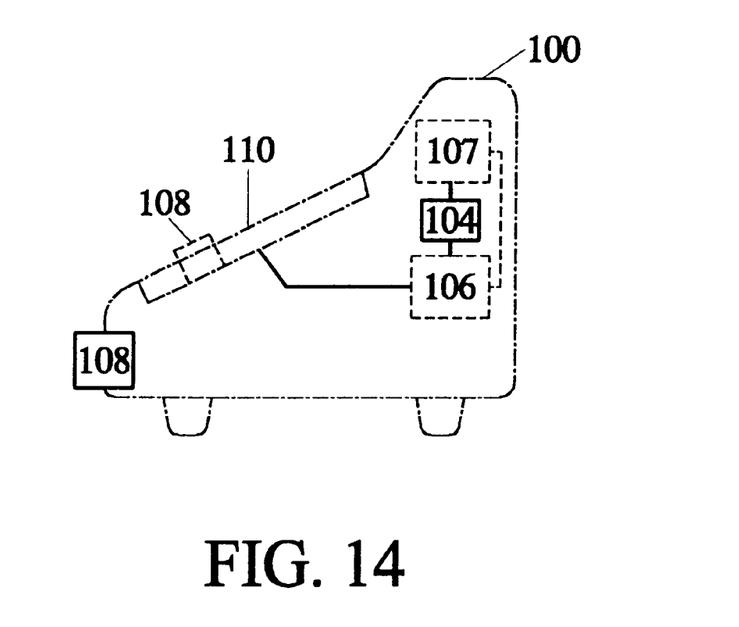
FIG. 14 is a schematic view that the rolling ball detection in the preferred embodiment of the present invention illustrated in FIG. 10 is replaced by the flat detection.
Figure 15:
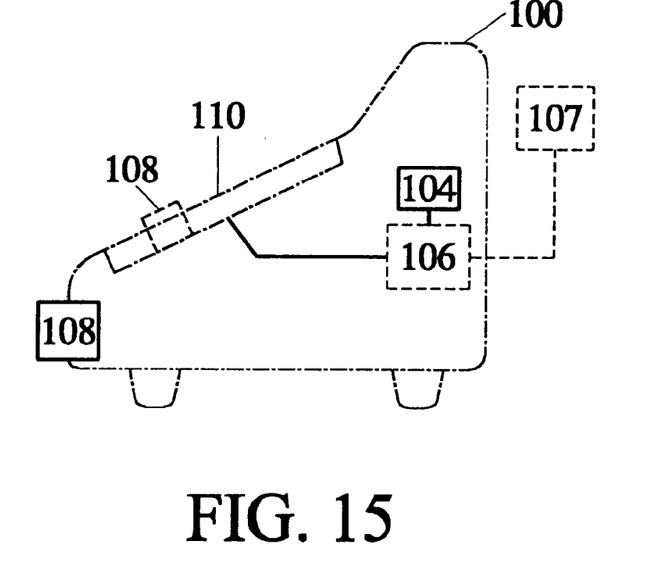
FIG. 15 is a schematic view that the rolling ball detection in the preferred embodiment of the present invention illustrated in FIG. 11 is replaced by the flat detection.
Figure 16:
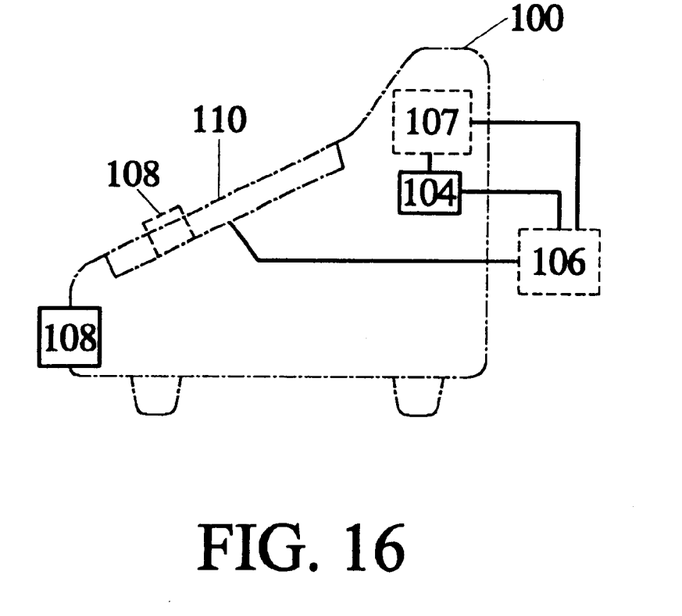
FIG. 16 is a schematic view that the rolling ball detection in the preferred embodiment of the present invention illustrated in FIG. 12 is replaced by the flat detection.

The main unit 106 or the display 107 may be provided as required. Either of the main unit 106 or the display 107 or both may be separately provided or integrated with the housing 100. FIG. 1 shows that the main unit and the display are separately provided. As illustrated in FIG. 10, the main unit and the display are made integrated with the housing. The display is independently provided while the main unit is integrated with the housing as illustrated in FIG. 11. In FIG. 12, however, the main unit is independently provided while the display is integrated with the housing. Wherein, one or more than one active propelling device 109 and one or more than one flat detection 110 are provided between the rolling ball 102 and the ball holder 101.

The manipulation means used in those preferred embodiments as respectively illustrated in FIGS. 1, 10, 11 and 12 is comprised of the foot controlled rolling ball 102, the detection 105 and the active propelling device 109. Within, the detection 105 can be replaced by the flat detection 110. The flat detection 110, an optional unit, is used to detect foot operation status by means of an optical-electric, electromagnetic, ultrasonic or mechano-electronic switch and to send signals to the main unit 106 where comparison is made depending on the preset comparison programs to generate relative signals for outputting to the display 107 or other interface device. As illustrated in FIGS. 13, 14, 15 and 16, the rolling ball detection in the preferred embodiments respectively shown in FIGS. 1, 10, 11 and 12 is replaced by a flat detection.

As disclosed above, the structure of the foot controlled rolling ball signal generator and its applications is innovative in teaching the foot operation to generate various relative signals that can be applied in computer input or as a training or entertaining equipment. Therefore, the application is duly filed accordingly.

What is claimed is:

1. A signal generator of foot controlled rolling ball to operate a main unit, a display device, interacting, or to be used as a foot exerciser or for entertaining purpose, essentially comprised of:

a housing 100: made of plastic, metal or wood or other selected material and a selected geometric form, including a ball holder 101 to couple a rolling ball 102; one or more than one segmental structure on the edge of the ball holder 101 to secure and restrict the segmental structure 103; and a selected number of low friction bearing, roller or needle structure at selected locations on the ball holder 101 to support the rolling ball 102 with low friction; the housing 100 being supported by multiples of foot in stationary model or each of those feet being provided with a roller and a braking device for mobile model; the housing 100 may be in a structure extending sideways to improve stability, furthermore, an operation switch may be added as required;

a power supply 104: comprised of a DC source converted from city power, a rechargeable battery, a super capacitor, or other storage device to supply power;

a rolling ball 102: made of selected material in a full or approximately spherical shape to be coupled to a spherical ball holder 101 of the housing 100 subject to operation by foot; a coupling mechanism for the roller ball 102 and the ball holder 101 of the housing 100 allowing to be removed or installed as desire, or being provided with an optional ring or a protruding bit to prevent falling of the rolling ball 102; the rolling ball 102 may be made in a specified structure to match the housing 100, and may be provided or omitted as required while its housing 100 is available to be adapted to any spherical object with given dimension and material;

a detection 105: operating by means of optical-electric or electromagnetic induction or static induction or conduction contact means to directly detect the motion status of the rolling ball 102; or being driven indirectly by the rolling ball 102 through a transmission system to detect direction and momentum of the rolling ball 102; or as required, the detection 105 being capable of indicating rolling speed to control a main unit 106 or a display 107;

an auxiliary pedal controller 108: comprised of a mechano-electronic or solid-state electronic switching device; one or more than one unit of the auxiliary pedal controller 108 being incorporated to the selected location for the housing 100 or independently provided for helping operation of kicking or stepping by the foot; further provided with a function of pressure detection to be adapted to the main unit 106 or the display 107 for relative control of the operation of the main unit 106 or the display 107;

a main unit 106: an optional unit, comprised of a mechano-electronic or a solid state electronic device, or a microprocessor and its peripheral circuits depending on the application; furthermore, a conductor, infrared, a RF electromagnetic wave, or ultrasonic equipment being provided to execute one-way or two-way wired or wireless transmission with the detection 105, the auxiliary pedal controller 108, and an active propelling device 109 for relative signal process based on operation signals from the rolling ball 102 and the auxiliary pedal controller 108, and for driving outputs to the display 107 or other devices; the main unit 106 may share the same structure with the housing 100 or can be an combined structure;

the display 107: also an optional device comprised of a mechano-electronic device, a solid-state electronic device, or a video CRT, multi-point LED, or OLED combination, PLED, PDP, LCD, TNLCD, PLED, bulb, or other device converting electric power into optical energy to display graphics, text, indication, and alarm; and to execute one-way or two-way wired transmission by means of conductor or wireless transmission by infrared or RF electromagnetic wave or ultrasonic device with the main unit 106; and the active propelling device 109: also an optional device, driven by electromagnetic effect, air pressure, oil hydraulic means, manual, or other sources to actively provide for the rolling ball 102 programmable, cyclic, irregular propelling or flapping in a same director or various directions at identical or various forces, or to drive the rolling ball 102 for displacement of other status to change the spacing between the rolling ball 102 and the ball holder 101 of the housing 100 and to transmit signals to the main unit 106 by means of a flat detection 110; the active propelling device 109 is an optional device.

2. A signal generator of foot controlled rolling ball as claimed in claim 1, wherein, the coupling plane between the rolling ball 102 and the ball holder 101 of the housing 100 is equivalent to, smaller than or slightly larger than a semi-sphere; or alternatively, between the rolling ball 102 and the ball holder 101 of the housing 100 a segmental structure 103 or a rolling bead is provided on the side closer to where operation takes place to facilitate manipulation of the rolling ball 102 by foot.

3. A signal generator of foot controlled rolling ball as claimed in claim 1, a floating structure by magnetism is provided or as an optional may be provided between the rolling ball 102 and the ball holder 101 of the housing 100 for indicating substantially absence of friction; alternatively, a pressurized gas using an air pump provided between the rolling ball 102 and the ball holder 101 of the housing 100 is jetted from an outlet provided at a selected position on the ball holder 101 to float the rolling ball 102, thus to reduce the friction between the rolling ball 102 and the ball holder 101 of the housing 100.

4. A signal generator of foot controlled rolling ball as claimed in claim 1, wherein, a hand rest is added to help operation in standing position and a portion of the preferred embodiment of the present invention between the hand rest 111 and the housing 100 is made foldable, KD type, or integrated.

5. A signal generator of foot controlled rolling ball as claimed in claim 1, wherein, the size of the rolling ball is selectable by providing one or more than one unit of auxiliary pedal controller 108 on a platform of the housing 100 so to allow the rolling ball to be operated by one foot or by both feet of one or more than one users.

6. A signal generator of foot controlled rolling ball as claimed in claim 1, wherein, as required, either of the main unit 106 or the display 107 is or both are provided, and either separately or integrated with the housing 100.

7. A signal generator of foot controlled rolling ball as claimed in claim 1, wherein, one or more than one active propelling device 109 and one or more than one flat detection 110 are provided between the rolling ball 102 and the ball holder 101.

8. A signal generator of foot controlled rolling ball as claimed in claim 1, wherein, the detection 105 of the manipulation means comprised of the foot controlled rolling ball 102, the detection 105 and the active propelling device 109 is replaced by the flat detection 110 to detect foot operation status by means of an optical-electric, electromagnetic, ultrasonic or mechano-electronic switch and to send signals to the main unit 106 where comparison is made depending on the preset comparison programs to generate relative signals for outputting to the display 107 or other interface device.

* * * * *